United States Patent
Roos

(10) Patent No.: US 6,263,067 B1
(45) Date of Patent: *Jul. 17, 2001

(54) TELEPHONE EXCHANGE RELATED MAIN DISTRIBUTION ARRANGEMENT

(75) Inventor: Sture Gösta Roos, Bergshamra (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 08/894,696

(22) PCT Filed: Apr. 12, 1996

(86) PCT No.: PCT/SE96/00476

§ 371 Date: Aug. 26, 1997

§ 102(e) Date: Aug. 26, 1997

(87) PCT Pub. No.: WO96/33580

PCT Pub. Date: Oct. 24, 1996

(30) Foreign Application Priority Data

Apr. 20, 1995 (SE) .................................................. 95 01455

(51) Int. Cl.$^7$ .............................. H04M 3/00; H05K 7/20; H02B 1/01; H01R 24/04
(52) U.S. Cl. ........................ 379/327; 361/690; 361/703; 361/709; 361/715; 361/727; 361/831; 439/668; 379/332
(58) Field of Search ...................................... 361/688, 709, 361/710, 711, 712, 714, 716, 725, 727, 728, 729, 730, 690, 695, 703, 715, 752, 831; 379/326, 327, 328, 329, 330, 332, 397; 439/43, 668

(56) References Cited

U.S. PATENT DOCUMENTS

| | | | |
|---|---|---|---|
| 4,758,924 | 7/1988 | Dillon et al. | 361/692 |
| 5,199,878 | * 4/1993 | Dewey et al. | 379/332 X |
| 5,237,486 | 8/1993 | LaPointe et al. | 361/681 |
| 5,309,320 | 5/1994 | Smith | 361/704 |
| 5,509,066 | * 4/1996 | Saligny | 379/327 |
| 5,982,618 | * 11/1999 | Roos | 361/695 |

FOREIGN PATENT DOCUMENTS

| | | | |
|---|---|---|---|
| 37 17 009 C2 | 9/1990 | (DE) | H04B/1/00 |
| 0 272 521A2 | 12/1987 | (EP) | H05K/7/14 |
| 0 349 285A2 | 6/1989 | (EP) | H04Q/1/04 |
| 0 449 150 A2 | 10/1991 | (EP) | H01L/23/40 |
| 0 564 315 A1 | 10/1993 | (EP) | H05K/7/20 |
| 2 132 445 | 7/1984 | (GB) | H04Q/1/14 |
| 59-115692 | 12/1982 | (JP) | H04Q/1/16 |

* cited by examiner

Primary Examiner—Harry S. Hong
(74) Attorney, Agent, or Firm—Burns, Doane, Swecker & Mathis, L.L.P.

(57) ABSTRACT

The invention comprises a main distribution arrangement for a telephone exchange, including a rack (1); several subscriber-related connectors whose positions are affixed to the rack, coordinated to one or more connection terminals (2a); and several external connectors that belong to telephone exchange-related line circuits, also affixed to the rack and coordinated to one or more connection terminals (3a). Said connection terminals are situated close to one another, and are arranged, with required main distribution conductors (23), to connect selected subscriber-related connectors with selected telephone exchange-related external connectors. A predetermined number of telephone exchange-related line circuits are coordinated to a block (10). Each block (10) can be inserted into and removed from the rack along parallel bars (11, 12). The leading edge section (10d) of a block (10)—as determined when the block that is being slid into the rack—presents line circuit-related external connectors, coordinated to one or more connection terminals (10e, 15a) that, when a block (10) is fully inserted, interacts electrically with said telephone exchange-related external connectors, coordinated to one or more connection terminals (3a).

11 Claims, 3 Drawing Sheets

*A*

*B*

TELEPHONE EXCHANGE RELATED MAIN DISTRIBUTION ARRANGEMENT

TECHNICAL FIELD

The present invention relates to a main distribution arrangement for a telephone exchange, more particularly to a main distribution arrangement that comprises a rack; several switchboard- or extension-related connection terminals that are affixed to the rack; and several telephone exchange-related connection terminals that are affixed to the rack. Said connection terminals are situated close to one another, and by means of required main distribution conductors, or jumpers, are organised to link given switchboard-related connectors within said switchboard-related connection terminals with specific telephone exchange-related external connectors within said telephone exchange-related connection terminals.

Throughout this document the expression telephone exchange-related main distribution arrangement with switchboard-related connection terminals and similar expressions are used to mean private branch exchange- and switchboard-related main distribution arrangements, including several extension-related connection terminals that are affixed to the rack.

DESCRIPTION OF THE BACKGROUND ART

Main distribution arrangements designed for telephone or switchboard exchanges have been shown in several different embodiments. These arrangements take up a large portion of the overall space allocated for a complete telephone exchange.

It is known that within a modern telephone exchange approximately 80% of the total volume is occupied by line circuit boards and the main distribution arrangement that is connected to them.

It is also a known practice to coordinate telephone exchange-related line circuits on printed board assemblies (called line interface boards); that is, on printed boards with surface-mounted discrete components. These printed board assemblies are then positioned in close connection to the main distribution arrangement.

Further, it is known that additional printed board assemblies and similar arrangements make up the structure for the other functions of a telephone exchange, creating conditions whereby they may interact electrically with the line circuits and their printed board assemblies.

It is also a known practice to build up line interface boards with line interface board magazines and cabinets, which use the same infrastructure as other parts and functions of the telephone exchange; for example, switches and processors.

A Main Distribution Frame (MDF) or an internal switchboard—with which the line circuits can be redistributed internally in the switch—is required in order to connect each line circuit constructed on the line interface board to an arbitrary subscriber.

Conductors from the subscribers' cables are terminated at connectors, arranged in blocks or contact units. Similarly, subscriber-related conductors from the line interface boards are terminated at connectors, arranged in blocks or contact units.

Blocks of this kind are mounted in an independent infrastructure, and ofttimes consist of U-beams, which function as carriers.

The previously disclosed characteristics that are associated with the present invention include diverting heat to, and cooling it at, adjacent cooling flanges—the heat is produced by discrete components mounted on printed boards.

As examples of the background art we refer to the publications EP-A1-0 564 315; EP-A2-0 449 150; U.S. Pat. No. 4,758,924; U.S. Pat. No. 5,237,486; and DE-C2-3 717 009.

Similarly, the following publications relate to the background art:

GB-A-2 132 445

This publication shows and describes a main distribution frame (MDF) for a telephone exchange, including a terminal field (2) for connecting to subscriber conductors; and contact units that plug into a type of line interface board unit that is suitable for the lines that are served. The rack is divided into two sections.

The contact units are related to blocks. Each block is equipped with a back plane that supports the conductors for said block.

Each back plane provides access to the TDM link for the connection equipment.

A number of block sets are shown to include several blocks that are aligned one above the other in a column, where a central column and an inner block provide access to the stretches of cable.

Patent Abstract of Japan, Abstract of JP 59-115692, Pub. Jul. 4, 1984

This publication shows line interface boards that consist of a line circuit module 9 with plug-in type connection terminals 10.

The modules can, independently of one another, be inserted or removed from the frame structure 7.

An additional module 21 can be attached to the module 9 via a plug-in system.

EP-A2-0 349 285

This publication shows another plug-in type of module with several modules that can be inserted or removed from a rack arrangement.

The modules are positioned side by side.

Said module consists of a mother board and several daughter boards with an application of printed circuits. Two edge-related guide bars are affixed to the board.

Further, each module includes several individually-removable printed board assemblies that relate to each daughter board.

The plug-in system of a circuit module, which can be made to interact with a rack arrangement, shows that a module (10), seen in FIG. 1, must be designed as a printed circuit board (12) with a back edge (20), a front edge (18), and upper and lower edges (14, 16). The back edge (20) is equipped with a distribution module (22) that stretches the entire length of the edge (20) and is designed to interact with a corresponding distribution module in the back plane.

The board module shows several parallel guiding tracks that are used to hold four printed board assemblies (34). These relate to the daughter board, and are adapted to interact with the circuit module.

U.S. Pat. No. 5,309,320

This publication shows a component board whose body, which can be cast of a thermally-conductible dielectric material, is cast as a printed circuit board whose design exactly conforms to that of an electronic arrangement.

A metal plate can form part of a converter.

The converter can be applied to a cold plate and a printed circuit board box in order to conduct heat from the electronic components.

A direct casting process may be used.
EP-A2-0 272 521

This publication shows a back plane with a bar (2) for inserting or removing a printed board assembly (4) that has a back plane-related means of connection (3).

In order to divert heat, a front plate (6) is equipped with cooling flanges (7).

In particular, this invention comprises the arrangement for inserting and removing the printed board assembly.

Further, the publication shows that the inside is equipped with a contact organ (3) that interacts with the contact organ of the connection plate(4) inside the cover (5).

SUMMARY OF THE INVENTION

Technical Problems

Given the background art, as it has been described above, it should be considered a technical problem to be able to create, by simple means, conditions whereby the volume that is required for the line interface boards, their function, and the main distribution arrangement can be significantly reduced in terms of volume but not number.

Another technical problem is in being able to simplify, in a decisive way, a main distribution arrangement for a telephone exchange, by showing an alternative infrastructure, and by being able to provide conditions for establishing a line interface that can be used in a functional and flexible way.

Another technical problem is in being able to realise the conditions that are necessary for moving required line circuits on one printed board assembly to a main distribution block, which thereby also will contain line circuit functions.

Another technical problem is in being able to realise the significance of coordinating a predetermined number of telephone exchange-related line circuits to a printed board assembly that is designed as a block, and further, to design each of these blocks to be insertable and removable along parallel bars that are affixed to said rack and/or cooling flanges, which support each block respectively.

Yet another technical problem is in being able to realise the significance of designing the leading edge section of a block—determined when the block is being inserted—to show the line circuit-related external connector, coordinated to one or more connection terminals, which when the block is fully inserted, interacts electrically and mechanically with said telephone exchange-related external connector, coordinated to one or more connection terminals.

Another technical problem is in being able to realise the conditions that are required for said block and said bars to interact with one another in such a way that produced heat is conducted, via heat conducting metal parts, to the rack and to cooling flanges that are affixed to, are that a part of, the rack.

Still another technical problem, when creating a compact main distribution arrangement for a telephone exchange, is in being able to create conditions for subscriber-related connection terminals to be positioned in a column adjacent to said telephone exchange-related connection terminals.

Another technical problem is in being able to create conditions whereby a column of rows of telephone-related connection terminals is positioned between two columns of rows of subscriber-related connection terminals and required jumpers can be connected, stretching between telephone exchange-related external connectors and subscriber-related connectors.

Still another technical problem, given a compact main distribution arrangement for a telephone exchange of the kind described above, is in being able to create conditions whereby said bars stand in direct contact with, and are made up of, rack-related cooling flanges and heat producing discrete components that are mounted on printed boards can be positioned within said block in and adjacent to the area into which the bars extend.

Another technical problem, given a main distribution arrangement for a telephone exchange of the kind described above, is in designing each block so that it can be shaped and constructed of a metallic cover that, with the exception of required electrical connections, completely encloses one or more printed boards that have discrete components mounted on them.

Another technical problem is in being able to create conditions whereby the thickness of the material, and the allocation of thickness within the metallic cover is designed to transfer heat satisfactorily, via the bar, to rack-related cooling flanges, even during conditions of peak traffic, when the greatest heat is generated.

Yet another technical problem is in being able to create conditions whereby the cover or the block can be sealed completely, thereby providing an EMC-shield (Electro Magnetic Compatibility).

Another technical problem is in being able to create conditions whereby given blocks, or all blocks, can be equipped with one or more surface enlargements, in order to divert heat.

Another technical problem, given a compact main distribution arrangement for a telephone exchange of the kind described above, is in enabling said line circuit-related external connector to interact with connectors in additional blocks that in turn interact electrically and mechanically with said telephone exchange-related external connectors.

Finally, it ought to be considered a technical problem to be able to create conditions whereby said additional blocks can, if necessary, comprise further means of connection, such as lightning protection.

Solution

In order to solve one or more of the above technical problems, the present invention proceeds from a telephone exchange-related main distribution arrangement that comprises a rack, several subscriber-related connectors for a telephone exchange, where said connectors are affixed to the rack, coordinated to one or more first connection blocks and several external connectors for a telephone exchange, where said external connectors are affixed to the rack, coordinated to one or more connection blocks. Said connection blocks are arranged close to one another and coordinated with required main distribution conductors (jumpers) in order to link selected subscriber-related connectors with selected line circuit-related external connectors.

The invention is based on a pre-determined number of telephone exchange-related line circuits that are coordinated to a block that encloses a printed circuit board. Each block may be inserted or removed along parallel bars that are attached to, or make up, said rack. The leading edge of the block—determined when the block is being inserted—shows line circuit-related external connectors that are coordinated to one or more connection terminals that, when the block is completely inserted, electrically and mechanically interacts with said subscriber-related connectors. Said block and said bars interact in such a way that the heat produced within the block, for example, from discrete components mounted on a printed circuit board, is conducted in a known way to the rack and/or to cooling flanges.

The proposed embodiments, which fall within the scope of inventive thought, show that said subscriber-related connection terminals must be oriented in rows in a column to the side of said line circuit-related connection terminals.

Further, the invention shows that a column of rows of line circuit-related connection terminals are positioned between two columns of rows of subscriber-related connection terminals.

The invention also shows that said bars must stand in direct contact with rack-related cooling flanges, and that heat-producing discrete components, which are mounted on printed boards, must be positioned in said block within, or adjacent to, the area into which the bars extend.

Further, we see that each block is to be formed of a metallic cover that encloses a printed board with discrete components, and that the thickness of the material, as well as how this thickness is allocated within the cover, should be adapted to successfully transport heat via a bar or the bars.

Ideally, the cover is sealed to provide satisfactory EMC-shield.

The invention also shows that the block must be equipped with one or more surface enlargements.

Finally, the invention shows that line circuit-related external connectors for a block must interact with internal and external connectors, coordinated to one or more connection terminals in an additional block that in turn interacts electronically, via said main distribution conductor, with line circuit-related connectors and connection terminals, situated adjacent to subscriber-related connectors.

Advantages

The primary advantage that is considered to characterise a main distribution arrangement for a telephone exchange is that conditions are created whereby it is possible to reduce the volume previously needed for the line interface boards, simplify the drawing of cables and the infrastructure and making it possible to build a functionally flexible line interface with good heat deflection.

According to the present invention, the primary characterising properties of a main distribution arrangement for a telephone exchange are stated in the characterising clause of claim 1 below.

BRIEF DESCRIPTION OF THE DRAWINGS

According to the present invention, one proposed embodiment for a main distribution arrangement for a telephone exchange will now be described in greater detail, relative to the attached drawings, where.

DESCRIPTION OF THE CURRENTLY PROPOSED EMBODIMENT

Figure 1:
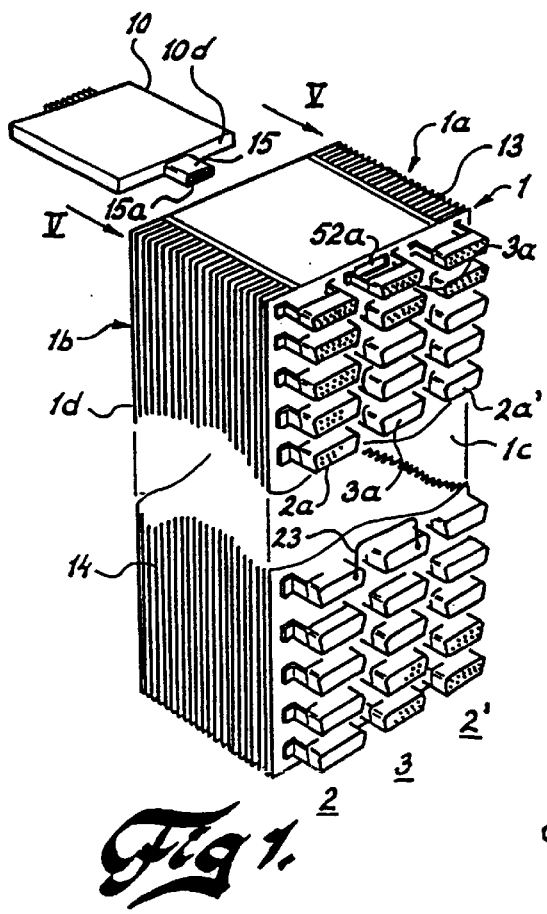
FIG. 1 shows in a first perspective view, a cabinet that has been adapted for several line interface board-related blocks, which show the most significant characteristics of the present invention, with a column of line interface-related connection terminals for a telephone exchange that are oriented in the middle, and—oriented to the side—two columns of subscriber-related connection terminals for a telephone exchange.
Figure 2:
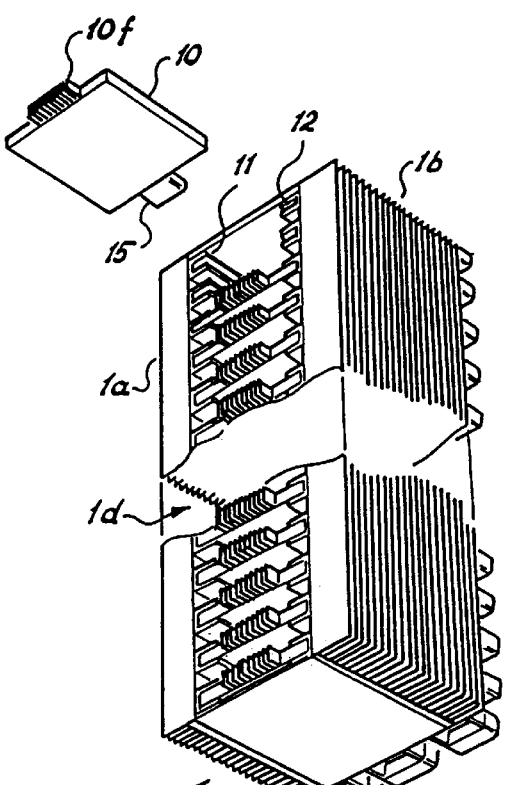
FIG. 2 shows the cabinet from an other, opposite, perspective view.

FIGS. 1 and 2 show, in two different views, a cabinet that comprises a main distribution arrangement for a telephone exchange.

The cabinet, which we designate Reference 1, includes a rack with two parallel, opposing rack sides 1a, 1b, as well as a main distribution-related rack side 1c.

From an additional rack side id, several blocks can be inserted and removed in a way that will be described in greater detail later in this description.

The invention is based on the concept that each block of this kind must be able to enclose a printed board assembly that may include several—for example, thirty—line circuit connections that have been designed for a telephone exchange.

FIG. 1 shows several subscriber-related connectors affixed to the rack. The connectors, which are coordinated to one or more connection terminals, are structured in rows and positioned above one another in a column 2. FIG. 1 also shows several line circuit-related external connectors for a telephone exchange that are affixed to the rack. The connectors, which are coordinated to one or more connection terminals, are structured in rows and positioned in a column 3.

FIGS. 1 and 2 illustrate that two subscriber-related connection terminals are positioned in columns adjacent to said column of line circuit-related connection terminals 3, forming two columns labelled 2 and 2'.

Preferably, said connection terminals 2a, 3a, 2a' will consist of standardised and/or known connection terminals with a predetermined number of connectors within each terminal.

The columns 2, 3, 2' of connection terminals are situated close to one another. By means of required main distribution conductors (jumpers) the connection terminals are arranged to electrically connect selected subscriber-related connectors with selected line circuit-related external connectors.

Obviously, the number of jumpers is comparatively large since each connected subscriber must use two physical conductors to connect electrically with its own line circuit.

Inasmuch as this method of connection is known, we will not describe it in greater detail.

To facilitate the reader's understanding, a single main distribution conductor 23 of this kind is shown in FIG. 1. The conductor is connected in a known way to its connectors.

A predetermined number of a previously-known kind of telephone exchange-related line circuits is coordinated to a block 10, which supports a printed board that has discrete components mounted on its surface.

The line circuits are only schematically illustrated for the printed board 10', and are assumed to include a discrete component each 10a, 10b that is mounted on the surface of the printed board 10'.

When applied to a telephone exchange, the invention requires access to a large number of subscriber-related conductors, which are available for connection to a line circuit that has been allocated to a subscriber, via a main distribution arrangement that, in this example shown formed of a conductor 23.

In a practical application, a main distribution arrangement will require several blocks. However, inasmuch as each block may be considered to be identical to the block 10, hereafter we will limit our discussion to that block.

Each block 10 has an external cover 10c of metal, for example aluminium, that envelops a printed board 10' which interacts electrically with its surroundings—line circuit-related connection pins and terminals 3a'—via block-related external connectors 10d.

Although the printed circuit board may have different types of functions, but the ensuing description relates solely to printed circuit boards with line circuits.

Each block 10 may be inserted and removed by means of parallel pars 11, 12, which are affixed to said rack in a known way. In particular, the bars are affixed to the rack sides 1a, 1b, which are made up of cooling flanges 13, 14.

The leading edge of the block 10, as determined when the block is being inserted, shows block-related external connectors 10 that are allocated to line circuits, coordinated to a connection terminal 10e. When the block 10 is fully inserted, the connector interacts electrically with said telephone exchange-related external connector 3b, coordinated to a connection terminal; for example, the terminal 3a.

Note, the external connector 10d associated with the block must directly or indirectly be able to interact electrically with the external connectors 3b for the connection terminal 3a, thereby being accessible from the outside for connecting to the subscribers via jumpers.

Said block 10 and said bars 11, 12 are in such mechanical co-action that the heat, which is generated within the block and by therein positioned components, will be transferred to the sides 1a, 1b of the rack and further on yo the cooling flanges 13, 14 on the sides.

Heat-producing discrete components 10a, 10b such as transformers, diodes, and transistors should be positioned on said printed board 10' adjacent to the area facing towards the bars 11, 12.

The thickness of the material, as well as the how this thickness is distributed within the cover or the block, is designed to satisfactorily transport heat via the bars.

Thus, it is possible to select various the thicknesses of the cover 10c, as well as lengths and widths of the bars 11, 12.

The thickness of the cover and other parts must be chosen to keep changes in temperature within given parameters, even during short periods of high load; for example, during periods less than 30 minutes.

Further, the cover 10c is completely sealed in order to provide effective EMC shielding. The block may even be equipped with one or more surface enlargements.

Figure 3:
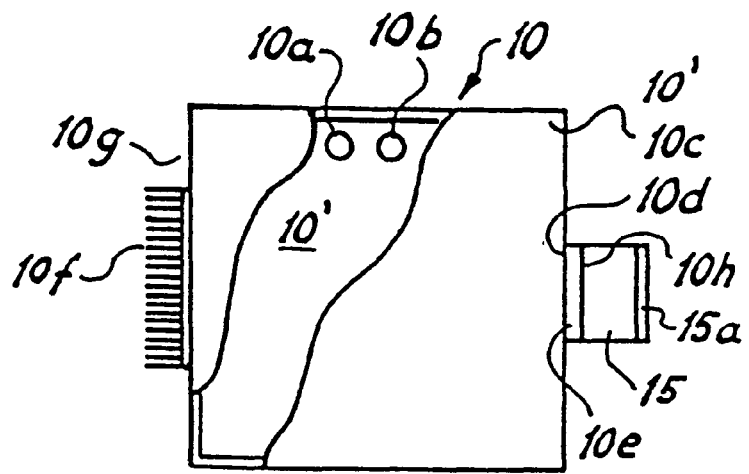
FIG. 3A shows in a plane, a block, with a cooling flange as a surface enlargement, that interacts with another block.
FIG. 3B shows in a plane, an exploded view of line circuit-related connection terminals when used by another block.
Figure 3:
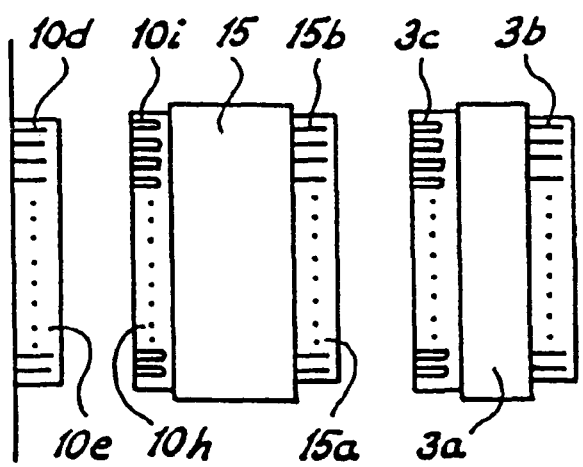

An example of a surface enlargement of this kind might include cooling flanges 10f that extend from the connection terminals 10d on the edge 10g of the block 10, as shown in FIG. 3.

Moreover, we see that said line circuit-related connection terminal 10e for block 10, with associated external connectors 10d, must be able to interact with corresponding internal connectors 10i, which belong to a connection terminal 10h in an additional block 15. In turn, the additional block 15 presents a connection terminal 15a, with thereto belonging external terminals 15b, that interacts electrically with internal connectors 3c that belong to said line circuit-related connection terminal 3a.

The additional block 15 may consist of a simple connection between the internal connectors 10i in the terminal 10h and the external connectors 15b in the terminal 15a; it might also contain circuit connections and/or circuit arrangements; for example, over-voltage protection.

For a person skilled in the art, it is clear that when external and internal connectors are meant to interact with one another, the internal connectors may, for example, be made of sockets and the external connectors may consist of pins, or vice versa.

Figure 4:
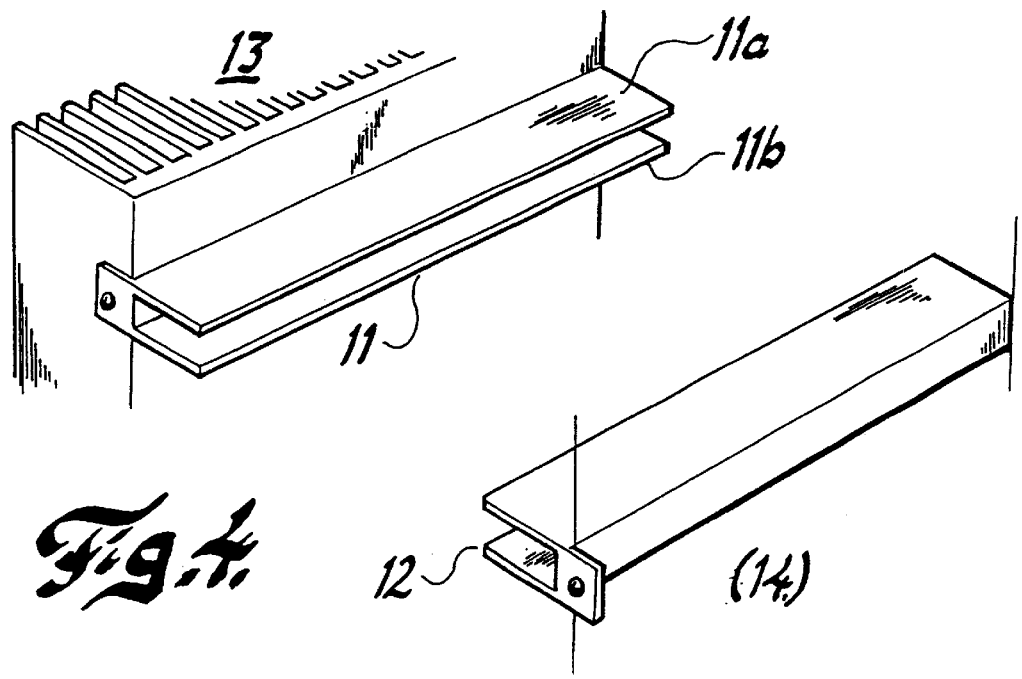
FIG. 4 shows in perspective, opposing bars for receiving a block, where each block is mounted directly on its own cooling flange.

FIG. 4 is meant to illustrate that opposing bars 11, 12 are directly affixed, in a known way, to adjacent cooling flanges. The length and width of the legs 11a, 11b are chosen to provide a desired transfer of heat.

The distance between the legs 11a, 11b is adapted to only slightly exceed the thickness of the block 10.

Figure 5:
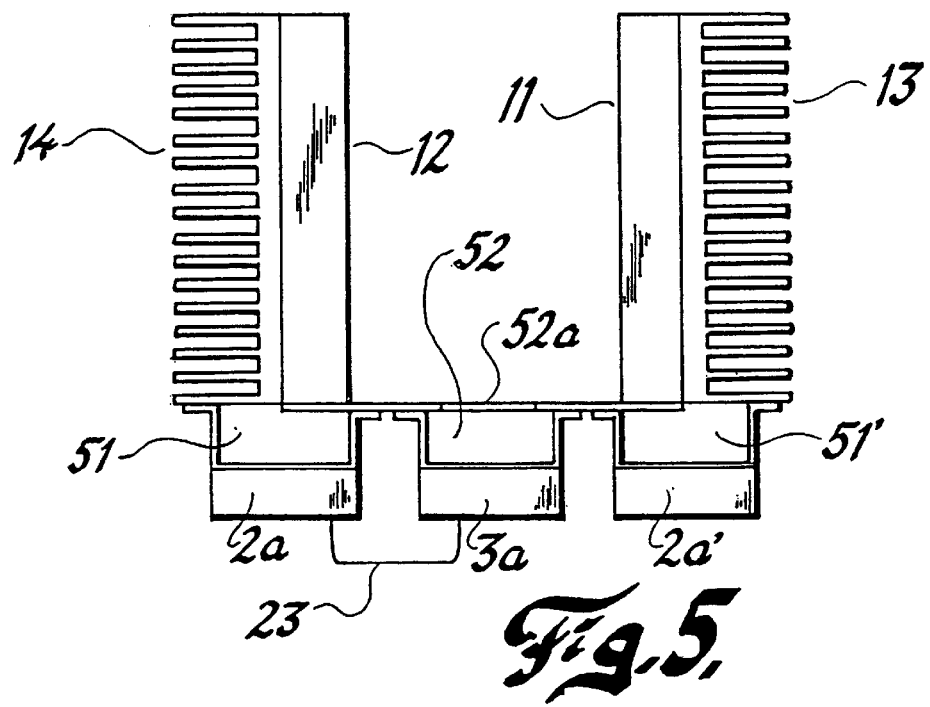
FIG. 5 shows a cut through the cabinet, according to a line V—V in FIG. 1.

FIG. 5 is meant to illustrate that subscriber-related cables must be coordinated within a given space 51 (51'), and that existing conductors must, in a known way, be attached to the back of the connection terminal 2a, in order to leave the front free for required jumpers.

The space 52 is allocated to the additional block 15. An opening 52a is designed to create a free passage for the block 15.

In a practical embodiment, the adjacent blocks are positioned more closely to one another than is shown in the figure.

Obviously, the invention is not limited to the above exemplifying embodiments, but may be modified within the scope of inventive thought outlined in the following claims.

What is claimed is:

1. A main distribution arrangement for a telephone exchange that comprises a rack, with two side-related rack sides, and two oriented rack sides where one of said oriented rack sides has a number of fixed-positioned subscriber-related connectors on its outside, coordinated to one or more subscriber-related connection terminals, and a number of telephone exchange related external connectors that belong to telephone exchange-related line circuits, said telephone exchange related external connectors being coordinated to one or more connection terminals, whereby said subscriber related connection terminals and said connection terminals are situated close to one another and, with required main distribution conductors coordinated to connect the telephone exchange-related external connectors that belong to the line circuits to external fixed-positioned subscriber-related connectors or the subscriber-related connection terminals; the line circuits, that belong to the telephone exchange are coordinated to blocks, where each block is slidable into and out of said rack and where the front or the leading edge of said blocks present external connectors that belong to the line circuits; said external connectors being coordinated to one or more connection terminals that, when a block is fully inserted, interact electrically with internal telephone exchange related connectors that are coordinated to one or more connection terminals, wherein a number of blocks and said rack are arranged for a heat transfer to rack-related cooling flanges that form said side-related rack sides, that said internal telephone exchange-related connectors are related to the rack and linked electrically as well as mechanically to the telephone exchange-related external connectors, that each of said blocks have connectors adapted to interact with internal related connectors in an additional block that, in turn, interacts electrically via connectors with said telephone exchange-related external connectors for the rack and that said additional blocks include one or more circuit arrangements.

2. An arrangement according to claim 1, wherein said subscriber-related connection terminals are oriented in a column positioned to the side of said connection terminals, that belong to the line circuits.

3. An arrangement according to claim 1, wherein a column of one or more rows of external telephone exchange-related connection terminals is positioned between two columns of one or more rows of subscriber-related connection terminals.

4. An arrangement according to claim 1, wherein discrete heat-producing components are oriented in said blocks within, or adjacent to, areas facing towards bars, that each block is formed of a metallic cover that encloses a printed board with discrete component; that each block is adapted for several line circuits; and that said line circuits interact electrically with said block-related connectors that belong to external line circuits.

5. An arrangement according to claim 1, wherein the thickness of the material, and the allocated thickness within the covering, is designed to transport heat via bars.

6. An arrangement according to claim 1, wherein the covering is sealed in order to provide an EMC-shield.

7. An arrangement according to claim 1, wherein the block is equipped with one or more surface enlargements.

8. An arrangement according to claim 1, wherein said block-related, external line circuit-related, connectors are arranged within a central section relative to the block.

9. An arrangement according to claim 2, wherein a column of rows of the connection terminals is positioned between two columns of rows of subscriber-related connection terminals.

10. A main distribution arrangement for a telephone exchange, comprising:

a first block having internal and external connectors;

a rack, said rack further comprising:

cooling flanges; and subscriber related connectors having both internal and external connectors, wherein said internal and external connectors are electrically and mechanically connected to each other, where said flanges and subscriber related connectors form sides of said rack; and an additional block comprising one or more circuit arrangements and internal and external connectors;

wherein said rack and said first block are electrically connected through said additional block.

11. A main distribution arrangement for a telephone exchange, comprising:

a first block having internal and external connectors;

a rack, said rack further comprising:

cooling flanges; and subscriber related connectors having both internal and external connectors, wherein said internal and external connectors are electrically and mechanically connected to each other, where said flanges and subscriber related connectors form sides of said rack; and an additional block comprising one or more circuit arrangements and internal and external connectors;

wherein the external connector of said first block connecting to the internal connector of said additional block, and wherein the external connector of said additional block is connected to the subscriber related internal connector of said rack.

* * * * *